United States Patent
West et al.

(10) Patent No.: US 10,324,166 B2
(45) Date of Patent: Jun. 18, 2019

(54) AFFORDABLE COMBINED PULSED/FMCW RADAR AESA

(71) Applicants: James B. West, Cedar Rapids, IA (US); Eric Itcia, Toulouse (FR)

(72) Inventors: James B. West, Cedar Rapids, IA (US); Eric Itcia, Toulouse (FR)

(73) Assignee: ROCKWELL COLLINS, INC., Cedar Rapids, IA (US)

( * ) Notice: Subject to any disclaimer, the term of this patent is extended or adjusted under 35 U.S.C. 154(b) by 597 days.

(21) Appl. No.: 14/868,253

(22) Filed: Sep. 28, 2015

(65) Prior Publication Data

US 2017/0090011 A1 Mar. 30, 2017

(51) Int. Cl.
*G01S 7/28* (2006.01)
*G01S 7/35* (2006.01)
(Continued)

(52) U.S. Cl.
CPC ............ *G01S 7/28* (2013.01); *G01S 7/35* (2013.01); *G01S 13/10* (2013.01); *G01S 13/32* (2013.01);
(Continued)

(58) Field of Classification Search
CPC ... G01S 7/28; G01S 7/35; G01S 13/10; G01S 13/32; G01S 13/426; G01S 13/89; G01S 2013/0254; G01S 13/003; G01S 7/032; G01S 7/2813; G01S 13/422; G01S 7/4052; G01S 7/4017; G01S 13/0209; G01S 7/023; G01S 13/9307; G01S 7/025; G01S 7/03; G01S 13/88; G01S 13/34; G01S 7/354; G01S 13/42; G01S 3/74; H01Q 3/46; H01Q 1/38; H01Q 21/0006; H01Q 3/267; H01Q 3/28; H01Q 3/26; H01Q 21/24; H04B 7/0678; H04W 84/12
(Continued)

(56) References Cited

U.S. PATENT DOCUMENTS 4,258,363 A * 3/1981 Bodmer ............... G01S 7/03
342/157
4,336,540 A * 6/1982 Goodwin ........... G01S 13/422
342/157
(Continued)

*Primary Examiner* — Timothy A Brainard
*Assistant Examiner* — Nuzhat Pervin
(74) *Attorney, Agent, or Firm* — Donna P. Suchy; Daniel M. Barbieri

(57) ABSTRACT

A combined pulsed and FMCW AESA radar system is described. The radar system includes an AESA array of radiating elements, an array of TR modules, an RF combiner/splitter, a transmitter, a pulsed radar receiver and an FMCW radar receiver. Each TR module corresponds to a respective radiating element of the array of radiating elements. The transmitter is configured to transmit an excitation signal to excite selected or all radiating elements of the array of radiating elements via the TR modules. When the transmitter is in a pulsed radar mode, the pulsed radar receiver is configured to receive radar return signals via the RF combiner/splitter from radiating elements of the array of radiating elements via the TR modules. When the transmitter is in an FMCW radar mode, the FMCW radar receiver is configured to receive radar return signals from selected radiating elements of the array of radiating elements via the TR modules.

8 Claims, 10 Drawing Sheets

(51) Int. Cl.
*H01Q 3/46* (2006.01)
*G01S 13/02* (2006.01)
*G01S 13/10* (2006.01)
*G01S 13/32* (2006.01)
*G01S 13/42* (2006.01)
*G01S 13/89* (2006.01)

(52) U.S. Cl.
CPC ............ *G01S 13/426* (2013.01); *G01S 13/89* (2013.01); *H01Q 3/46* (2013.01); *G01S 2013/0254* (2013.01)

(58) Field of Classification Search
USPC ........................................................ 342/201
See application file for complete search history.

(56) References Cited

U.S. PATENT DOCUMENTS

| | | | | |
|---|---|---|---|---|
| 5,225,841 A * | 7/1993 | Krikorian | ............ | G01S 7/2813 342/204 |
| 5,351,053 A * | 9/1994 | Wicks | ................ | G01S 13/0209 342/140 |
| 5,412,414 A * | 5/1995 | Ast | ....................... | G01S 7/4017 342/174 |
| 5,493,304 A * | 2/1996 | Lee | ....................... | G01S 7/4052 342/173 |
| 5,929,810 A * | 7/1999 | Koutsoudis | ............ | H01Q 3/267 342/174 |
| 7,034,753 B1 * | 4/2006 | Elsallal | .............. | H01Q 21/0006 343/700 MS |
| 7,071,873 B2 * | 7/2006 | Tomasic | ................... | H01Q 3/28 342/372 |
| 7,190,305 B2 * | 3/2007 | Isaji | ....................... | G01S 7/354 342/107 |
| 7,450,067 B2 * | 11/2008 | Xin | ........................... | G01S 3/74 342/378 |
| 7,724,181 B2 * | 5/2010 | Natsume | ............... | G01S 13/426 342/103 |
| 7,746,266 B2 * | 6/2010 | Zoughi | ................... | G01S 7/025 342/179 |
| 8,238,318 B1 * | 8/2012 | Negus | ................... | H04W 84/12 370/338 |
| 8,466,846 B1 * | 6/2013 | Elsallal | .................... | H01Q 1/38 343/700 MS |
| 8,467,363 B2 * | 6/2013 | Lea | ........................ | H01Q 21/24 370/338 |
| 8,633,851 B2 * | 1/2014 | Vacanti | ..................... | G01S 7/03 342/149 |
| 8,754,811 B1 * | 6/2014 | Uscinowicz | ........... | H01Q 3/267 342/375 |
| 8,860,604 B2 * | 10/2014 | Oswald | ................... | G01S 13/42 342/107 |
| 8,958,408 B1 * | 2/2015 | Jain | ...................... | H04B 7/0678 342/368 |
| 9,194,946 B1 * | 11/2015 | Vacanti | ................... | G01S 13/28 |
| 9,599,704 B2 * | 3/2017 | Mitchell | ............ | G01S 13/9307 |
| 9,856,860 B2 * | 1/2018 | Vangen | ................... | F03D 17/00 |
| 9,874,626 B2 * | 1/2018 | Jain | .......................... | G01S 7/023 |
| 2005/0206556 A1 * | 9/2005 | Isaji | ....................... | G01S 7/354 342/149 |
| 2005/0225481 A1 * | 10/2005 | Bonthron | ................ | G01S 7/032 342/175 |
| 2008/0291087 A1 * | 11/2008 | Tietjen | ...................... | G01S 7/03 342/372 |
| 2009/0233549 A1 * | 9/2009 | Maltsev | ................... | H01Q 3/26 455/41.2 |
| 2009/0237092 A1 * | 9/2009 | Zoughi | ................... | G01S 7/025 324/637 |
| 2009/0303126 A1 * | 12/2009 | Jain | ........................ | G01S 13/003 342/368 |
| 2010/0265122 A1 * | 10/2010 | Oswald | ................... | G01S 13/42 342/136 |
| 2012/0154203 A1 * | 6/2012 | Vacanti | ..................... | G01S 7/03 342/149 |
| 2015/0323659 A1 * | 11/2015 | Mitchell | ............. | G01S 13/9307 342/41 |
| 2016/0091599 A1 * | 3/2016 | Jenkins | ................... | G01S 13/34 342/165 |

\* cited by examiner

US 10,324,166 B2

AFFORDABLE COMBINED PULSED/FMCW RADAR AESA

BACKGROUND

The present invention relates generally to the field of radar systems.

Pulsed radar systems provide a pulsed radar beam and reception of pulsed radar returns, and have a longer range than frequency-modulated continuous wave (FMCW) radar systems. On the other hand FMCW radars may provide higher (than pulsed) radar resolution and good radar detection for shorter range applications.

Combined FMCW/pulsed radar system are known which require two federated time division multiplexed systems and/or a diplexor for full-duplex. Such combined systems use two completely independent FMCW and pulsed systems with separate antennas or separate AESAs (active electronically scanned arrays).

SUMMARY

In one aspect, embodiments of the inventive concepts disclosed herein are directed to a combined pulsed and FMCW AESA radar system. The radar system includes an AESA array of radiating elements, an array of transmit/receive (TR) modules, a radio frequency (RF) combiner/splitter, a transmitter, a pulsed radar receiver and an FMCW radar receiver. Each TR module corresponds to a respective radiating element of the array of radiating elements. The RF combiner/splitter is configured to combine signals from the array of TR modules, and to split a signal to the array of TR modules. The transmitter is capable of operating in both FMCW and Pulsed modes, except when the two modes operate at highly separated frequencies. The transmitter is configured to transmit an excitation signal to excite either selected radiating elements of the array of radiating elements in FMCW mode or all radiating elements of the array in pulsed mode, via the TR modules. The pulsed radar receiver is configured to receive radar return signals via the RF combiner/splitter from all radiating elements of the array of radiating elements via the TR modules, when the transmitter is in a pulsed radar mode. The FMCW radar receiver is configured to receive radar return signals from selected radiating elements of the array of radiating elements via the TR modules, when the transmitter is in an FMCW radar mode.

DETAILED DESCRIPTION

Figure 1:
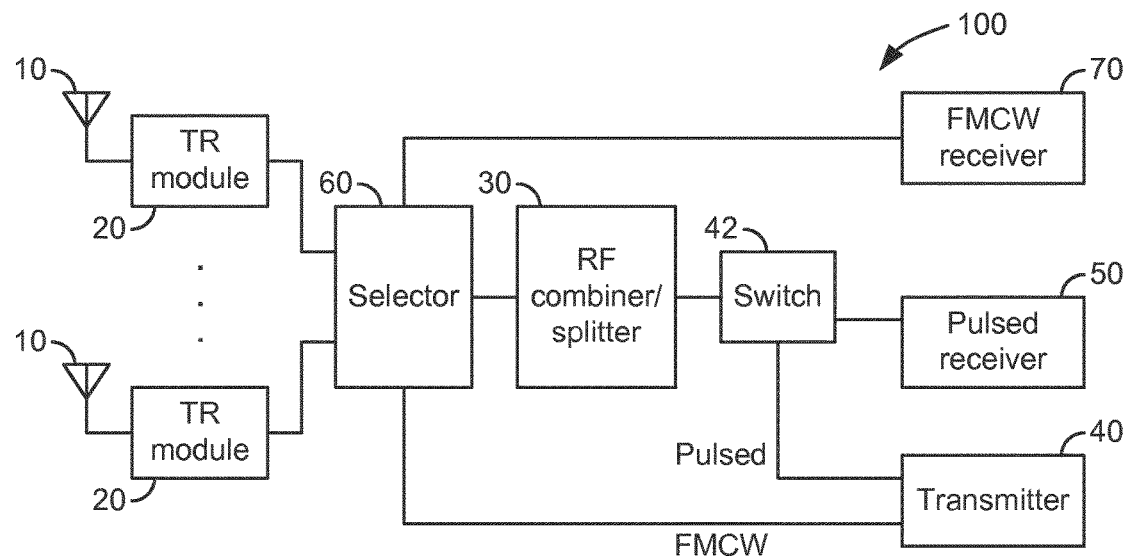
FIG. 1 is a schematic of a combined FMCW AESA radar system according to an embodiment of the inventive concepts disclosed herein.

FIG. 1 illustrates a combined pulsed and FMCW AESA radar system 100 according to inventive concepts disclosed herein. The radar system 100 includes radiating elements 10, transmit/receive (TR) modules 20, a radio frequency (RF) combiner/splitter 30, a transmitter 40, a pulsed radar receiver 50, an FMCW radar receiver 70, a selector 60, and a switch 42. The radiating elements 10 may be arranged as part of a single AESA. Generally, a radar processing function (not shown in FIG. 1) can be common to both modes or separate. While FIG. 1 illustrates a single shared transmitter for the two modes—FMCW and pulsed—in general the FMCW AESA radar system 100 may include separate transmitters for the different modes. For the combined pulsed and FMCW AESA radar system 100 of FIG. 1, FMCW and pulsed modes may operate at close, or the same frequencies which enables both modes to share the same transmitter 40, transmit/receive (TR) modules 20 and radiating elements 10. An example where the two modes use highly separated frequencies is illustrated for the system of FIGS. 7A and 7B.

Figure 2:
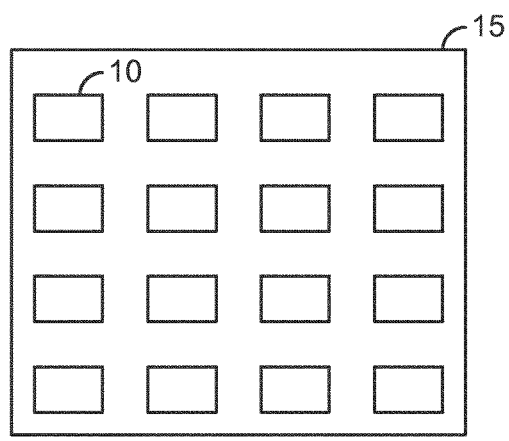
FIG. 2 illustrates radiating elements arranged in an array for the system of claim 1.

FIG. 2 illustrates the radiating elements 10 arranged in an array 15. The radiating elements 10 may be radar antennas, for example, arranged to transmit radar signals and to receive radar returns. FIG. 2 illustrates the array 15 to include a 4×4 array of radiating elements 10 for ease of illustration. In general, the array may include a much larger number of radiating elements 10.

Returning to FIG. 1, the radiating elements 10 will each have a corresponding TR module 20. Thus, each TR module 20 corresponds to a respective radiating element 10 of the array 15 of radiating elements 10.

The radar system 100 is designed to operate in pulsed radar mode or FMCW radar mode. The transmitter 40 is configured to transmit an excitation signal to excite radiating elements of the array 15 of radiating elements 10 via the TR modules 20. In pulsed radar mode, the transmitter 40 transmits an excitation signal to excite, through the switch 42 RF combiner/splitter 30 and selector 60 all radiating elements of the array 15 of radiating elements 10 to provide a pulsed radar beam from the array 15 of radiating elements 10. In FMCW radar mode, the transmitter 40 transmits an excitation signal to excite, through the selector 60, selected radiating elements of the array 15 of radiating elements 10 to provide a FMCW radar beam from the array 15 of radiating elements 10.

The selector 60 selects appropriate of the radiating elements 10 and corresponding TR modules 20, and selects between the transmitter 40, the RF combiner/splitter 30, and the FMCW receiver 70, according to the pulsed radar mode or FMCW radar mode.

In the pulsed radar mode, the selector 60 selects all radiating elements 10 and corresponding TR modules 20 and connects them to the RF combiner/splitter 30. Further, a switch 42 selects between the transmitter 40 and the pulsed radar receiver 50 in the pulsed radar mode. The selector 60 and the switch 42 may be readily implemented in radio frequency integrated circuit (RFIC) circuitry, such as by an RFIC switch matrix. The switch 42 and selector 60 are set such that the transmitter 40 transmits a pulsed excitation signal via the combiner/splitter 30 to excite all radiating elements of the array 15 of radiating elements 10 to provide a pulsed radar beam. After the pulsed radar signal is emitted by the array 15 of radiating elements 10, the switch 42 and selector 60 are set such that the pulsed radar receiver 50 receives radar return signals from all radiating elements of the array 15 of radiating elements 10 via the TR modules 20 via the RF combiner/splitter 30.

In FMCW radar mode, the selector 60 is set such that the transmitter 40 transmits an FMCW excitation signal to excite, via the TR modules 20, selected transmit radiating elements of the array 15 of radiating elements 10 to provide an FMCW radar beam. Simultaneous with the FMCW radar transmit signal being emitted by the array 15 of radiating elements 10, the selector 60 is set such that the FMCW radar receiver 70 receives radar return signals from selected receive radiating elements of the array 15 of radiating elements 10 via the TR modules 20.

Figure 7A:
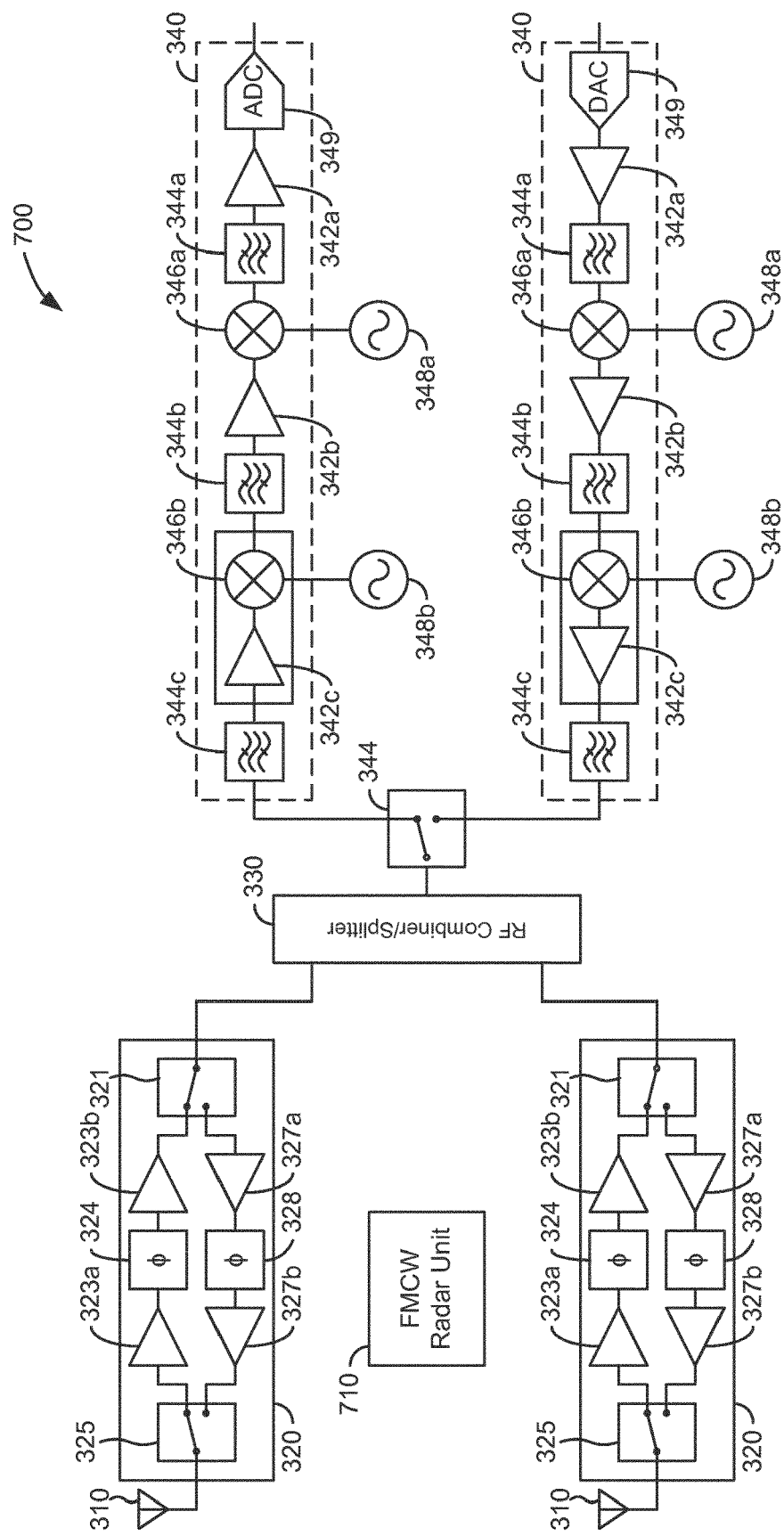
FIG. 7A is a schematic of a combined pulsed and FMCW AESA radar system according to another embodiment of the inventive concepts disclosed herein.
Figure 7B:
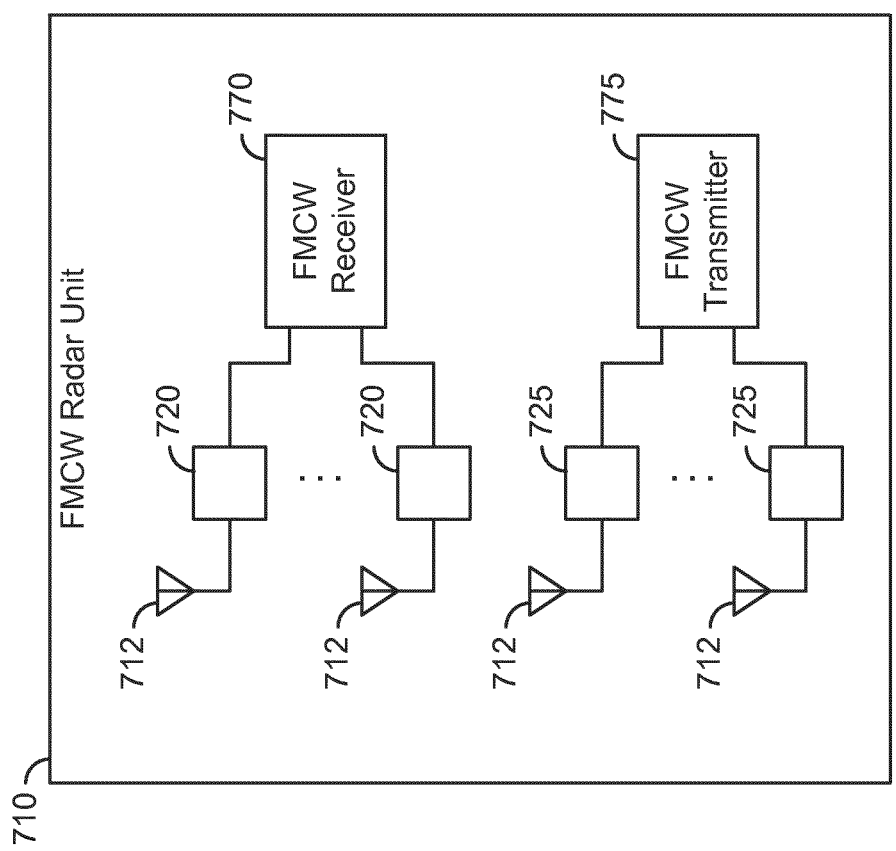
FIG. 7B is a schematic of the FMCW radar unit portion of the radar system of FIG. 7A.

The radar system 100 may be time division multiplexed between the FMCW radar mode and the pulsed radar mode. Simultaneous operation of both modes is possible if each mode uses a separate dedicated transmitter 40, each mode operates at different separated frequencies and the radiating elements 10 are either sufficiently broadband or separate radiating elements are used for each mode (as illustrated in FIGS. 7A and 7B, for example).

Figure 3:
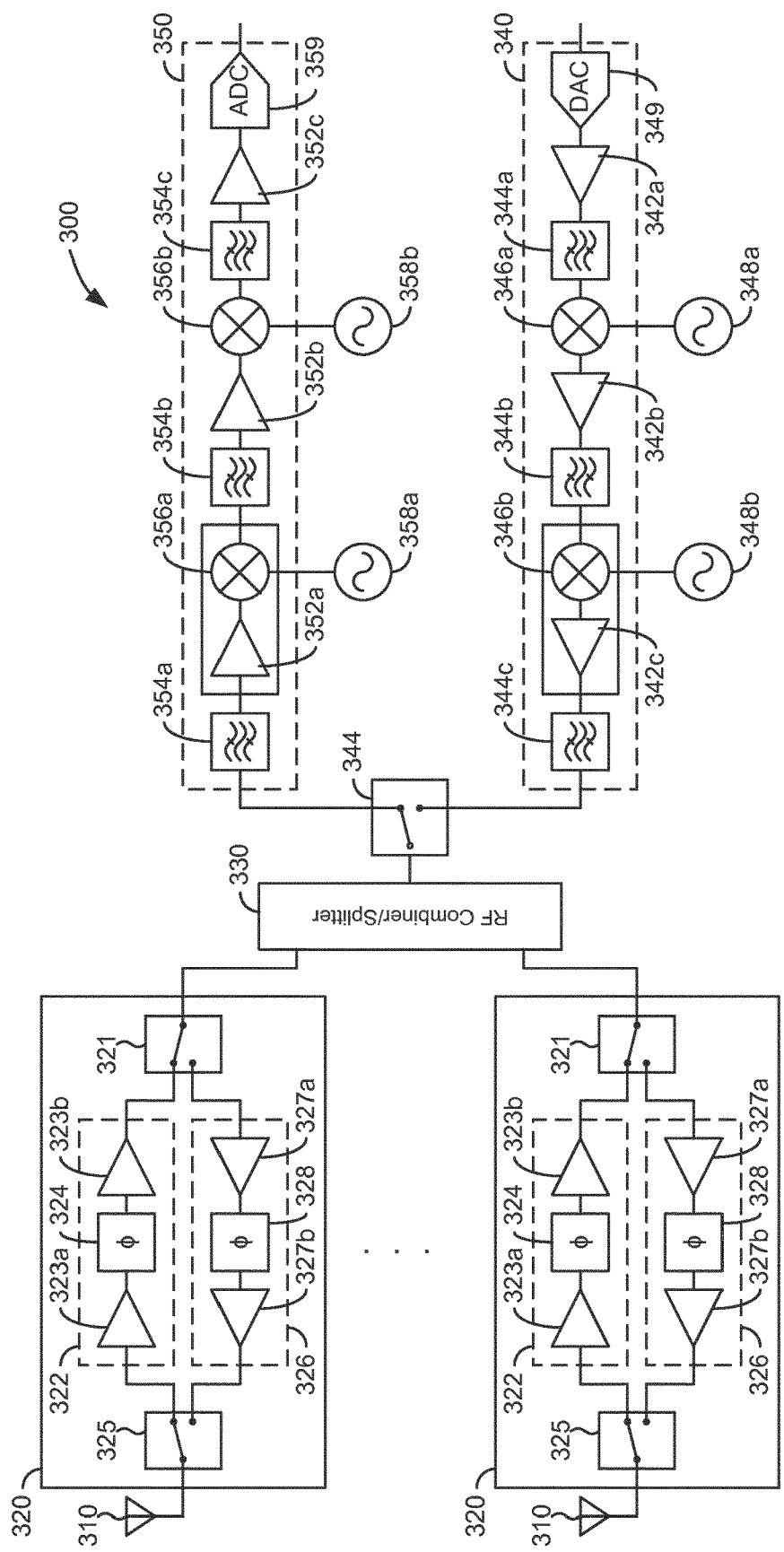
FIG. 3 is a schematic illustrating a pulsed radar portion of a radar system according to another embodiment of the inventive concepts disclosed herein.

FIG. 3 illustrates a pulsed radar portion 300 of a radar system according to inventive concepts disclosed herein. The pulsed radar portion 300 includes radiating elements 310, TR modules 320, a radio frequency (RF) combiner/splitter 330, a transmitter 340, and a pulsed radar receiver 350. In this illustration the RF combiner/splitter 330 is common to transmit and receive path, more generally, separate RF combiner/splitter, one for the transmitter one for the receiver, is possible.

The radiating elements 310 are arranged in an array, similar to the radiating elements 10 arranged in the array 15 as shown in FIG. 2.

Returning to FIG. 3, the radiating elements 310 will each have a corresponding TR module 320. Thus, each TR module 320 corresponds to a respective radiating element 310 of the array of radiating elements 310. The TR modules 320 each include a TR receiver 322 and a TR transmitter 326, and switches 321 and 325. When the pulsed radar portion 300 is transmitting a pulsed radar beam via the radiating elements 310, the switches 321 and 325 are set such that the TR transmitter 326 operates. When the pulsed radar portion 300 is receiving a pulsed radar return via the radiating elements 310, the switches 321 and 325 are set such that the TR receiver 322 operates.

The TR receiver 322 may have amplifiers 323a and 323b and a phase shifter component 324. Similarly, the TR transmitter 326 may have amplifiers 327a and 327b and a phase shifter component 328. More generally, Time Delay Units may replace phase shifter components 328 for ultra-broadband operation.

The transmitter 340 may have amplifiers 342a, 342b and 342c, and filters 344a, 344b and 344c following the amplifiers 342a, 342b and 342c, respectively, as shown in FIG. 3. The transmitter 340 further has mixers 346a and 346b, which function as upconverters, to mix a common coherent reference signal applied as the reference signals 348a and 348b, respectively. More generally, the number of mixers can be different from 2. The transmitter 340 further has a digital to analog converter (DAC) 349 to provide an analog signal to the amplifier 342a.

The pulsed receiver 350 may be a superheterodyne receiver as shown in FIG. 3. The pulsed receiver 350 may have amplifiers 352a, 352b and 352c, and filters 354a, 354b and 354c arranged before the amplifiers 352a, 352b and 352c, respectively, as shown in FIG. 3. The pulsed receiver 350 further has mixers 356a and 356b to mix a common reference signal applied as the reference signals 358a and 358b, respectively. More generally, the number of mixers can be different from 2. The pulsed receiver 350 further has an analog to digital converter (ADC) 359 to provide a digital signal based on an analog signal from the amplifier 352c.

The pulsed radar portion 300 further has a switch 344 to switch between the transmitter 340 and the pulsed receiver 350. When the pulsed radar portion 300 is providing a pulsed radar beam via the radiating elements 310, the switch 344 is set such that the transmitter 340 operates. In this case, the RF combiner/splitter 330 splits the excitation signal from the transmitter 340 to the TR modules 320 and corresponding radiating elements 310. When the pulsed radar portion 300 is receiving a pulsed radar return via the radiating elements 310, the switch 344 is set such that the pulsed receiver 350 operates. In this case, the RF combiner/splitter 330 combines the radar return signals from the radiating elements 310 and corresponding of the TR modules 320 and passes the combined signal to the pulsed receiver 350.

Figure 4A:
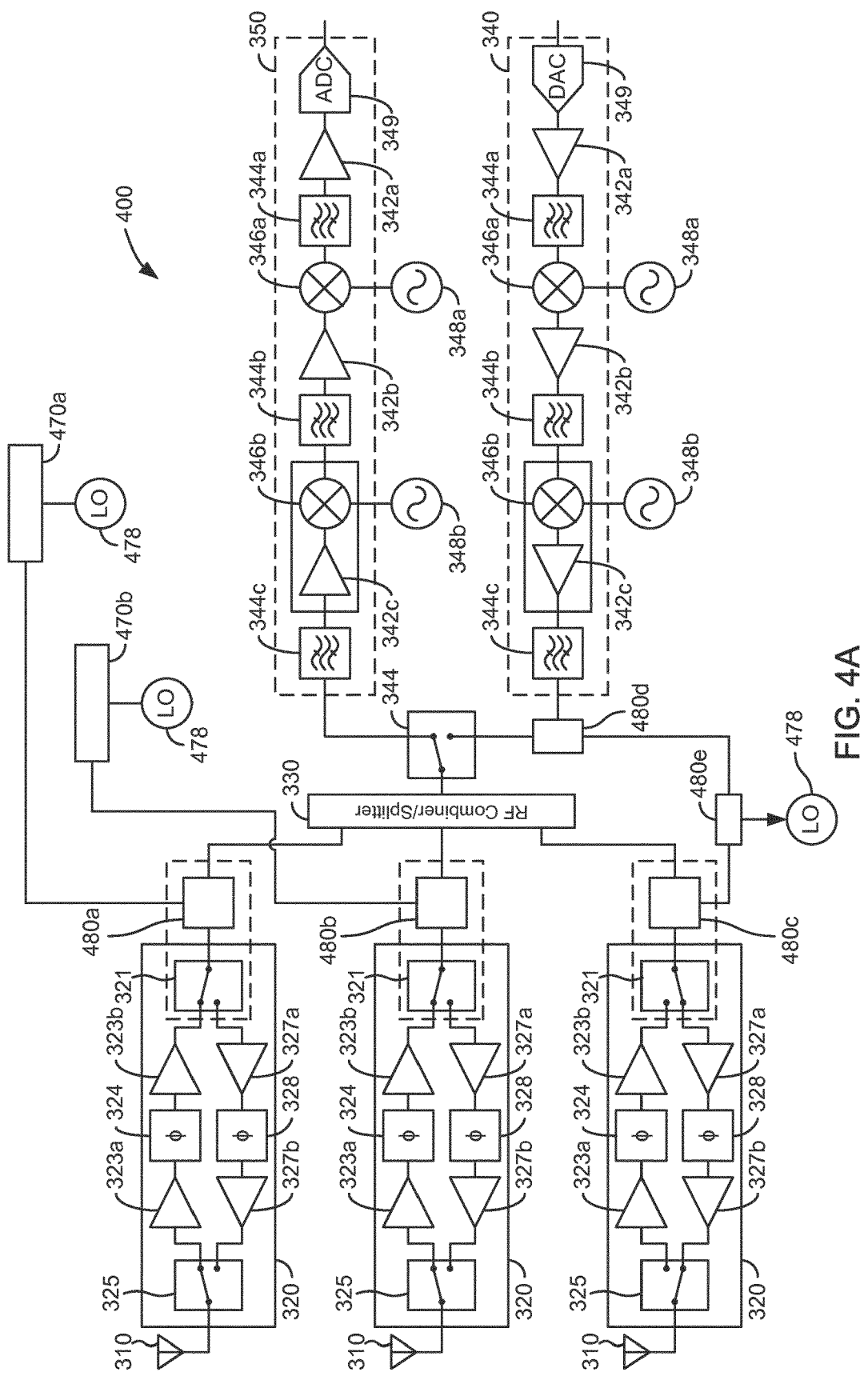
FIG. 4A is a schematic of a combined pulsed and FMCW AESA radar system which uses a single transmit radiating element in FMCW mode according to another embodiment of the inventive concepts disclosed herein.
Figure 4C:
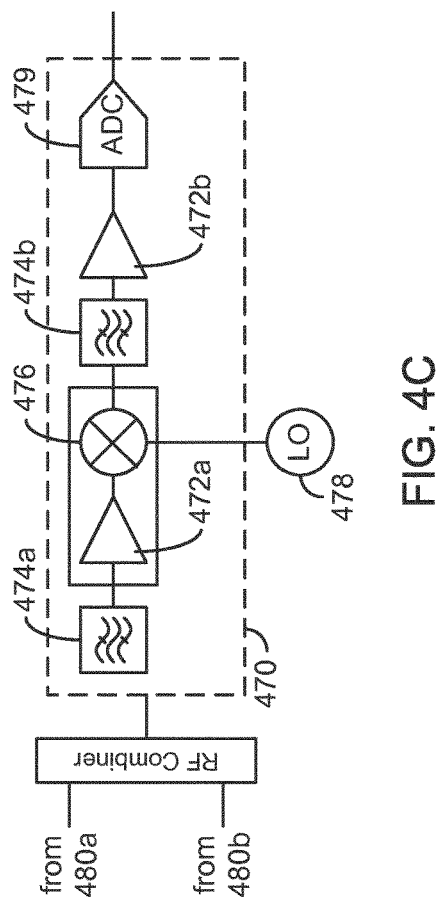
FIG. 4C is a schematic of a single FMCW radar receiver of a combined pulsed and FMCW AESA radar system according to an embodiment of the inventive concepts disclosed herein.
Figure 4B:
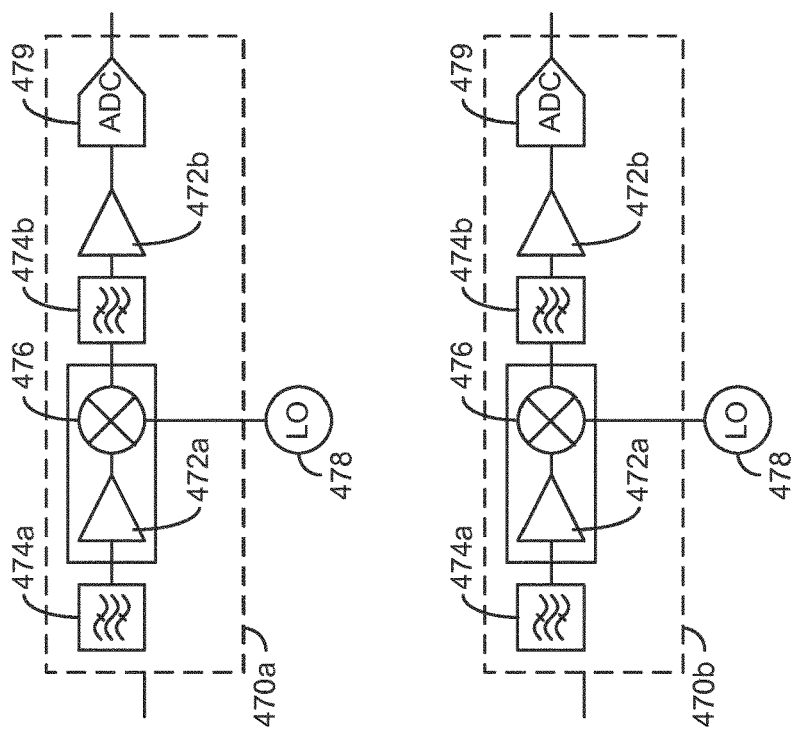
FIG. 4B is a schematic of multiple FMCW radar receivers of a combined pulsed and FMCW AESA radar system according to an embodiment of the inventive concepts disclosed herein.

FIG. 4A illustrates a combined pulsed and FMCW AESA radar system 400 according to inventive concepts discloses herein incorporating the pulsed radar portion 300 of FIG. 3, along with multiple FMCW radar receivers 470a, 470b, according to inventive concepts disclosed herein. FIG. 4B illustrates the multiple FMCW radar receivers 470a, 470b in more detail. In the case of digital beam forming (DBF), there will be one receiver 470 per radiating element 310 used for FMCW. For ease of illustration, FIGS. 4A and 4B illustrate two radar receivers 470a, 470b, where in general the number of radar receivers 470 may be more than two. The components of the pulsed radar portion 300 are the same as described with respect to FIG. 3, and are described with the same reference numerals.

The FMCW AESA radar system 400 is a radar system where the FMCW and the pulsed modes operate within a single frequency band. In this case, the transmitter 340 operates in both pulsed and FMCW modes and is common to these two modes. The single frequency band may be the X band, which is about from 8 to 12 GHz. The single frequency band, however, may be other than the X band, such as the W band from about 75 to 110 GHz, which is within the mm wave band from about 30 to 300 GHz, or other radio frequency bands.

The radar system 400 includes the FMCW radar receivers 470 and receivers associated switches 480a, 480b, and transmitter associated switches 480c and 480d. The FMCW radar receivers 470a, 470b are homodyne receivers as shown in FIG. 4B. The FMCW radar receivers 470a, 470b may each have amplifiers 472a and 472b, and filters 474a and 474b before the amplifiers 472a and 472b, respectively, as shown in FIG. 4B. The FMCW receivers 470a, 470b further have a mixer 476 to mix the receive signal with a common reference signal 478 coupled out from the transmitter 340 by coupler 480e. The FMCW radar receivers 470a, 470b further each have an ADC 479 which provides a digital signal based on an analog signal from the amplifier 472b, and which provide multiple phase centers to allow for DBF.

The switches 480a, 480b, 480c and 480d switch between the FMCW radar receivers 470a, 470b and the pulsed radar receiver 350 via the RF Combiner/Splitter 330, and between a direct path to the transmitter 340 and a path to transmitter 340 via the RF Combiner/Splitter 330 depending on whether the radar system 400 is in the FMCW radar mode or the pulsed radar mode. In the FMCW radar mode, the switches 480a and 480b are switched such that radar returns from selected of the TR modules 320 and corresponding radiating elements 310 are directed to the FMCW radar receivers 470a and 470b bypassing the RF combiner/splitter 330. Further, in the FMCW radar mode, the switches 480c and 480d are switched such that a transmission signal Tx from the transmitter 340 is applied to a selected TR module 320 (the bottom TR module in FIG. 4A) and its corresponding radiating element 310, bypassing the RF combiner/splitter 330. In addition a coupler 480e intercepts a portion of the transmit signal for being used as common reference signal 478 to be provided as local oscillator (LO) to the mixer 476 for the FMCW radar receivers 470a and 470b.

The radar system 400 may be time division multiplexed between the FMCW radar mode, which may provide DBF, and the pulsed radar mode.

FIG. 4B illustrates multiple FMCW radar receivers 470a and 470b for the FMCW operation. Alternatively, the radiating elements 310 selected for the FMCW receiver can be combined by a dedicated RF combiner 490, as illustrated in FIG. 4C. In this case there will be a single FMCW receiver 470, as illustrated in FIG. 4C. In this case no DBF technique is used.

Figure 4D:
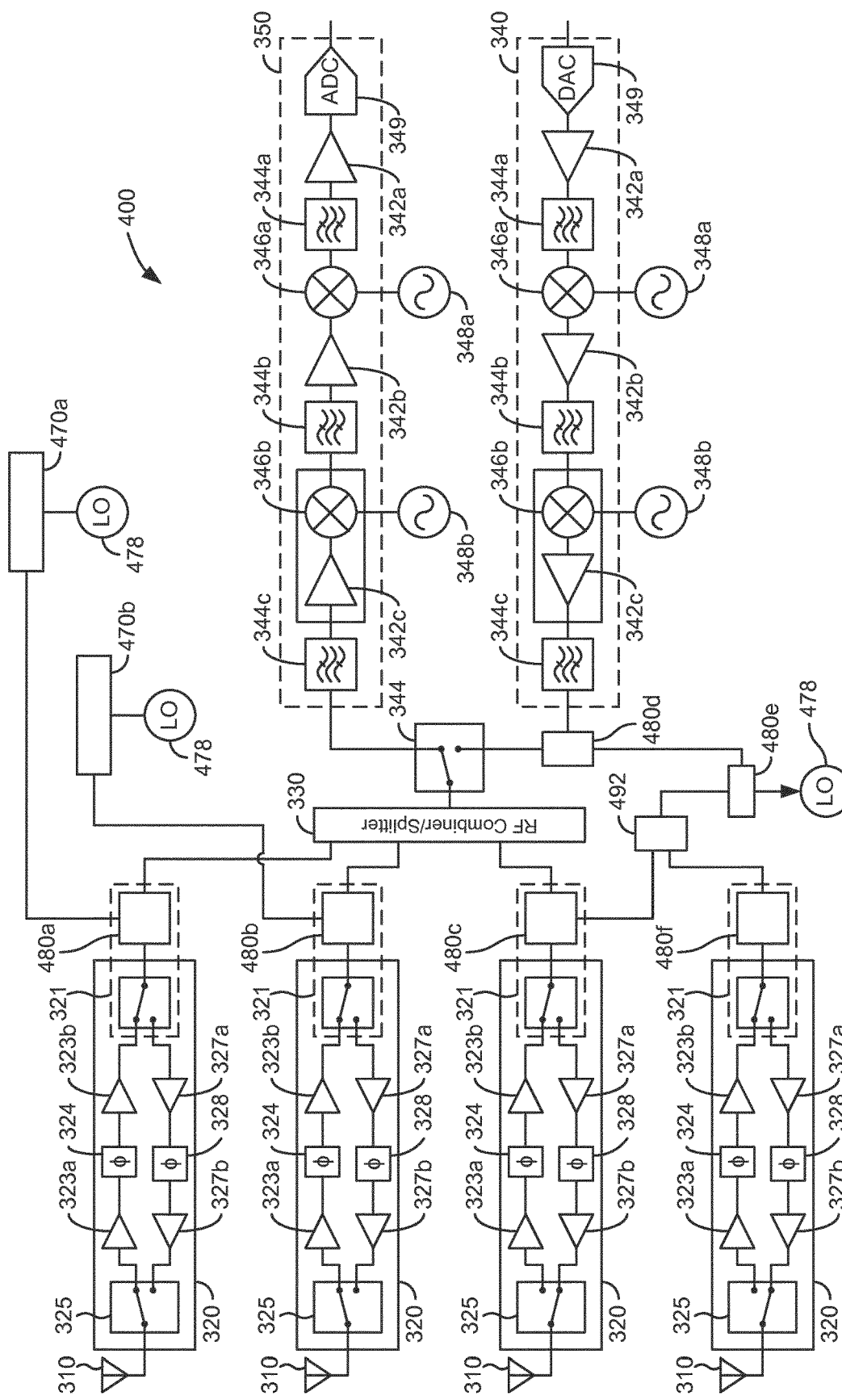
FIG. 4D is a schematic of a combined pulsed and FMCW AESA radar system using multiple transmit radiating elements in FMCW mode according to another embodiment of the inventive concepts disclosed herein.

The combined pulsed and FMCW AESA radar system 400 of FIG. 4A uses a single radiating element (the radiating element 310 from the bottom T/R module 320 in FIG. 4A) for FMCW transmission. Alternatively, more than one radiating element can be selected for the FMCW transmitter. In this case a dedicated RF splitter 492 may be used to split the FMCW transmitter signal towards the selected of the radiating elements 310, as illustrated in the combined pulsed and FMCW AESA radar system 400 of FIG. 4D. Further, in the FMCW radar mode of the combined pulsed and FMCW AESA radar system 400 of FIG. 4D, the switches 480c, 480f and 480d are switched such that a transmission signal Tx from the transmitter 340 is applied via the RF splitter 492 to selected TR modules 320 (the bottom two TR modules in FIG. 4D) and their corresponding radiating elements 310. While FIG. 4D illustrates two selected TR modules 320 for FMCW transmission, in general, more than two selected TR modules are possible.

Figure 5:
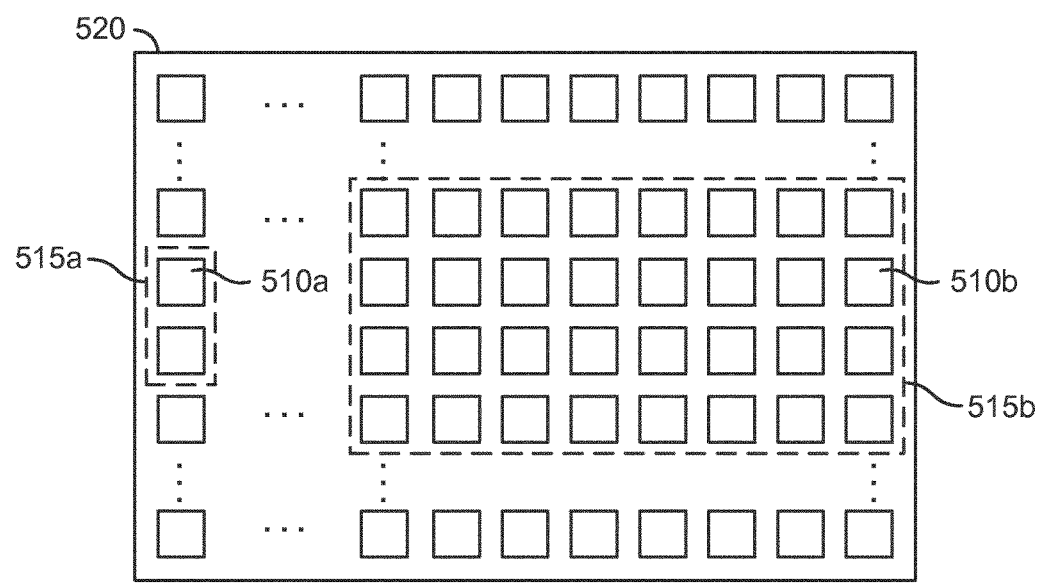
FIG. 5 illustrates an arrangement of an array of radiating elements with subarrays of radiating elements arranged on a single panel according to the system of FIG. 4A or 4D.

FIG. 5 illustrates an arrangement of an array of radiating elements 510 with a first subarray 515a of transmitter radiating elements 510a and a second subarray 515b of receiver radiating elements 510b according to inventive concepts of the invention. In pulsed radar mode all of the radiating elements 510 are used, while in FMCW radar mode only a subset of the radiating elements 510 are used. The transmitter radiating elements 510a of the first subarray 515a correspond to radiating elements which are selected, such as by an RFIC switch matrix, in the FMCW radar mode for the operation of the transmitter 340 in FIGS. 4A and 4D. The receiver radiating elements 510b of the second subarray 515b correspond to radiating elements which are selected in the FMCW radar mode for the operation of the FMCW radar receivers 470a, 470b in FIG. 4A, and FMCW radar receiver 470 in FIG. 4C.

The first subarray 515a of transmitter radiating elements 510a has an I×J arrangement, where I is the number of radiating elements in each column of the first subarray 515a and J is the number of radiating elements in each row of the first subarray 515a. The second subarray 515b of transmitter radiating elements 510b has an L×M arrangement, where L is the number of radiating elements in each column of the second subarray 515b and M is the number of radiating elements in each row of the second subarray 515b. FIG. 5 illustrates an arrangement where I is equal to 2, and J is equal to 1 for the ease of explanation, where other values of I and J are possible. Similarly, FIG. 5 illustrates an arrangement where L is equal to 8, and M is equal to 4 for the ease of explanation, where other values of L and M are possible.

For DBF applications it is desirable that the number of radiating elements 510b in the second subarray 515b of receiver radiating elements 510b be larger than the number of radiating elements 510a in the first subarray 515a of transmitter radiating elements 510a. This is so because the transmission radar beam may be broad, while the multiple receiver radar beams may be narrower for such DBF applications. Generally, the greater the number of receiver radiating elements 510b, the narrower the receive beams and the greater the number of receive beams that will be formed by DBF. In this regard, L may be greater than I, and M may be greater than J.

FIG. 5 illustrates an arrangement where the radiating elements 510 may be on a single panel 520. That is, the array of radiating elements 510 including the first subarray 515a of transmitter radiating elements 510a and the second subarray 515b of receiver radiating elements 510b, as well as any radiating elements for the pulsed radar mode, are all on the single panel 520.

Figure 6:
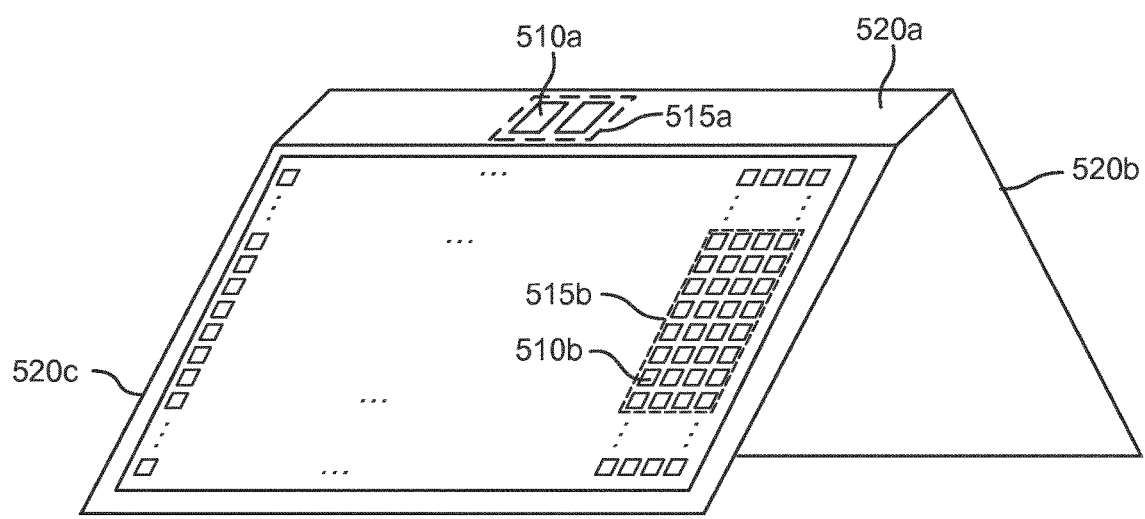
FIG. 6 illustrates an arrangement of an array of radiating elements with subarrays of radiating elements arranged on multiple panels in a chevron configuration according to the system of FIGS. 4A and 4D.

Alternatively, FIG. 6 illustrates an arrangement where the array of radiating elements 510 are arranged on more than one panel. In particular FIG. 6 illustrates an arrangement where the array of radiating elements 510 are arranged on three panels 520a, 520b and 520c in a chevron arrangement. The chevron arrangement includes a top panel 520a and two side panels 520b and 520c. As shown in FIG. 6, the first subarray 515a of transmitter radiating elements 510a is arranged on the top panel, while the second subarray 515b of receiver radiating elements 510b is arranged on one or more of the side panels 520b and 520c. While FIG. 6 illustrates the second subarray 515b of receiver radiating elements 510b arranged only on the side panel 520c, some or all of the receiver radiating elements 510b may be arranged on the side panel 520b.

The chevron arrangement of FIG. 6 where the first subarray 515a of transmitter radiating elements 510a is arranged on the top panel 520a, while the second subarray 515b of receiver radiating elements 510b is arranged on one or more of the side panels 520b and 520c, provides isolation between the first subarray 515a and the second subarray 515b. The chevron arrangement of FIG. 6 may also uses the radiating elements 510 on one or more of the panels in the pulsed radar mode.

FIGS. 7A and 7B illustrate a combined pulsed and FMCW AESA radar system 700 according to inventive concepts disclosed herein incorporating the pulsed radar portion 300 of FIG. 3, along with an FMCW radar portion 710 according to inventive concepts disclosed herein. The components of the pulsed radar portion 300 are the same as described with respect to FIG. 3, and are described with the same reference numerals. FIG. 7A illustrates the combined pulsed and FMCW AESA radar system 700, while FIG. 7B illustrates in more detail the FMCW radar unit 710 portion of the radar system 700, which is composed of FMCW receiver and transmitter.

The combined pulsed and FMCW AESA radar system 700 is a radar system where the FMCW receiver 770 and FMCW transmitter 775, and the pulsed receiver 350 and transmitter 340 operate within two highly separated frequency bands. Specifically, the FMCW receiver 770 and FMCW transmitter 775, along with the corresponding R (receive) modules 720 and T (transmit) modules 725 operate within a first frequency band, while the pulsed receiver 350 and corresponding TR modules 320 operate within a second frequency band. The first frequency band may be the W band while the second frequency band may be the X band. The first and second frequency bands may also be other than the W and X bands, respectively. The first frequency band may have a frequency range between about 30 and 300 GHz, for example, and the second frequency band may have a frequency range between about 3 and 30 GHz, for example.

The FMCW radar unit 710 includes the FMCW radar receiver 770 and the FMCW radar transmitter 775. R modules 720 are arranged between the radiating elements 712 and the FMCW radar receiver 770. T modules 725 are arranged between the radiating elements 712 and the FMCW radar transmitter 775. The FMCW radar unit 710 transmits via T modules 725 and corresponding radiating elements 712, and simultaneously receives radar returns via R modules 720 and corresponding radiating elements 712, in the FMCW radar mode. The radiating elements 712 along with the R modules 720 and T modules 725 are different in structure from the radiating elements 310 and TR modules 320 so that the radiating elements 712 and R and T modules 720, 725 are appropriate for operation in the first frequency band, while the radiating elements 310 and TR modules 320 are appropriate for operation in the second frequency band. The pulsed radar mode and the FMCW mode may be operated simultaneously for the combined pulsed and FMCW AESA radar system 700 due to the isolation created by the wide frequency separation between the pulsed and FMCW systems.

Figure 8:
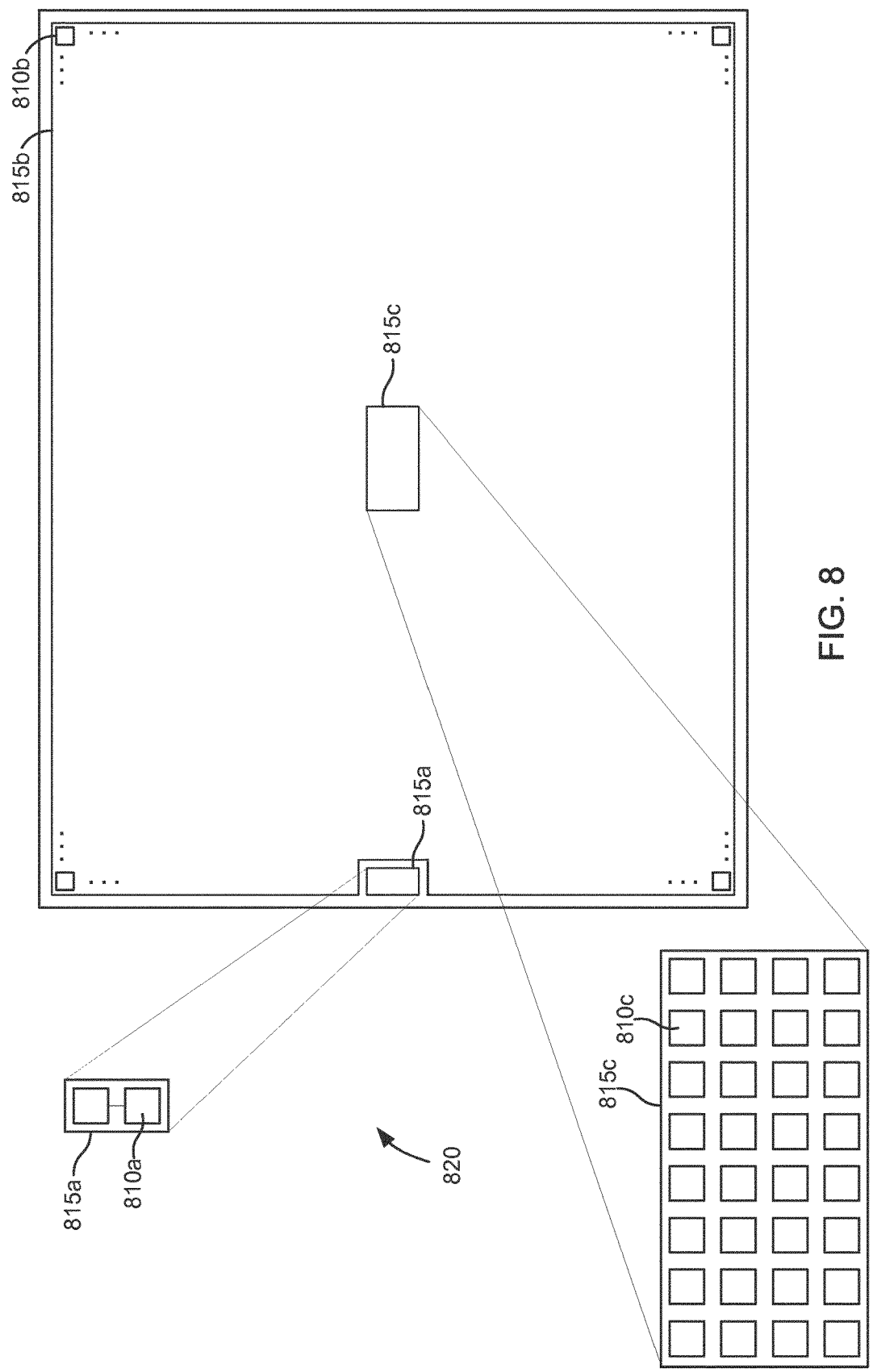
FIG. 8 illustrates an arrangement of an array of radiating elements with subarrays of radiating elements arranged on a single panel according to the system of FIG. 7A.

FIG. 8 illustrates an arrangement where the radiating elements 810 may be on a single panel 820. That is, the array of radiating elements 810 includes a first subarray 815a of transmitter radiating elements 810a transmitting in the first frequency band, a second subarray 815b of transmitter/receiver radiating elements 810b transmitting and receiving in the second frequency band, and a third subarray 815c of receiver radiating elements 810c receiving in the first frequency band, all on the single panel 820. The first subarray 815a and the third subarray 815c are used for FMCW mode, while the second subarray 815b is used for pulsed mode.

While FIG. 8 illustrates a first subarray 815a of transmitter radiating elements 810a in a 2×1 arrangement for illustrative purposes, in general other sizes for the first subarray 815a are also contemplated. Similarly, while FIG. 8 illustrates a third subarray 815c of receiver radiating elements 810c in a 8×4 arrangement for illustrative purposes, in general other sizes for the third subarray 815c are also contemplated.

In general, the size of the first and third subarray 815a and 815c of transmitter and receiver radiating elements 810a and 810c receiving in the first frequency band may be much smaller than the size of the second subarray 815b of transmitter/receiver radiating elements 810b operating in the second frequency band. Arranging the third subarray 815c within the second subarray 815b may increase the side lobe level or other pertinent radiation parameters due to the "hole" mainly caused by the third subarray 815c, and to a lower level by the first subarray 815a within the second subarray 815b. A relatively small size of the first and third subarray 815a and 815c reduces the size of the "hole". Moreover, the increase in the side lobe level may be compensated for by either a taper over design or nontraditional aperture synthesis. While the "hole" due to the third subarray 815c within the second subarray 815b is near the center of the second subarray 815b, in general the hole may be anywhere within the second subarray 815b, such as near the edges.

Figure 9:
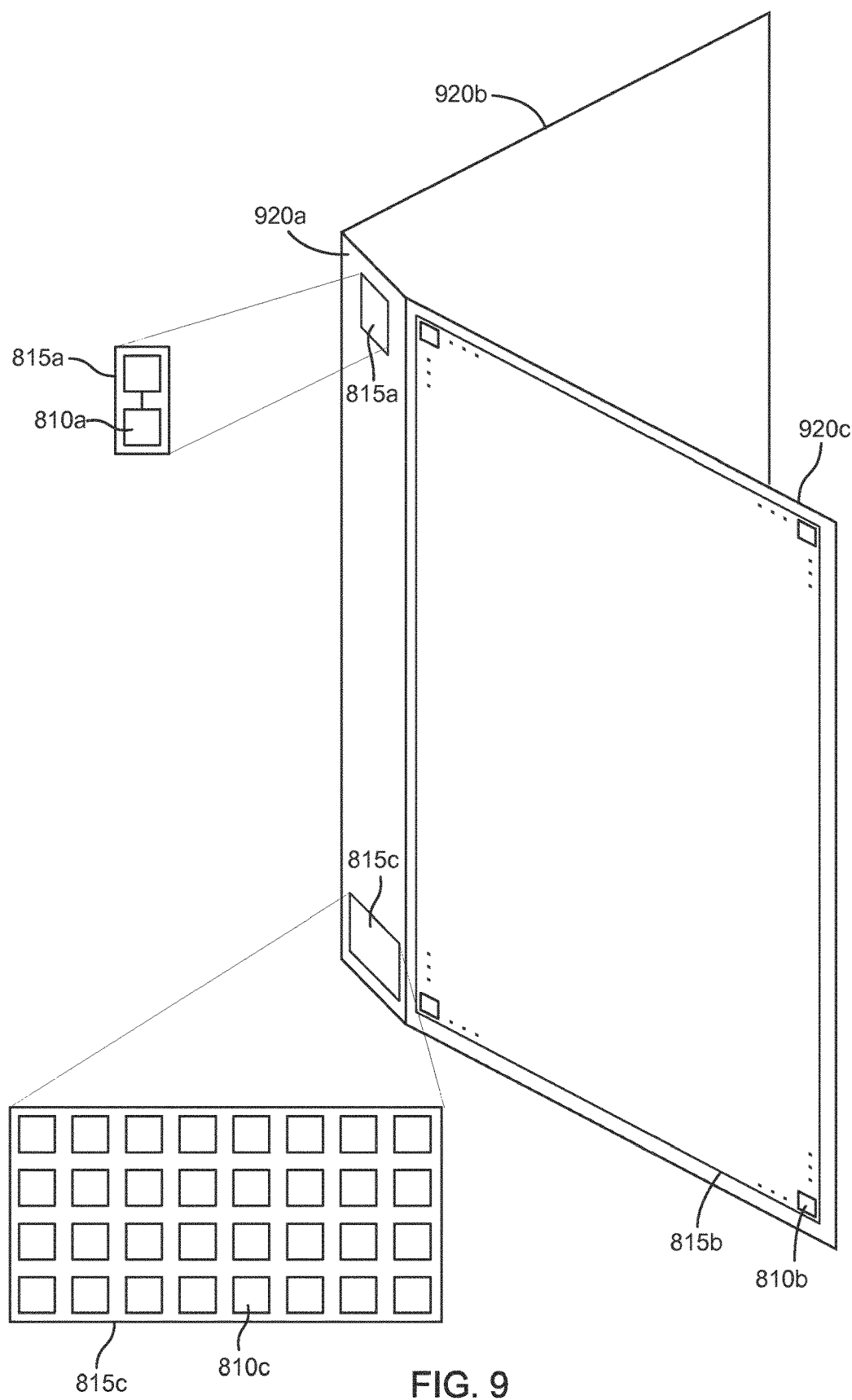
FIG. 9 illustrates an arrangement of an array of radiating elements with subarrays of radiating elements arranged on multiple panels in a chevron configuration according to the system of FIG. 7A.

Alternatively, FIG. 9 illustrates an arrangement where the array of radiating elements 810 are arranged on more than one panel. In particular FIG. 9 illustrates an arrangement where the array of radiating elements 810 are arranged on three panels 920a, 920b and 920c in a chevron arrangement. The chevron arrangement includes a top panel 920a and two side panels 920b and 920c. As shown in FIG. 9, the first subarray 815a of transmitter radiating elements 810a and the third subarray 815c of receiver radiating elements 810c are arranged on the top panel 920a, while the second subarray 815b of transmitter/receiver radiating elements 810b is arranged on the side panels 920b and 920c. Similar to the arrangement in FIG. 8, in FIG. 9 the third subarray 815c of receiver radiating elements 810c is shown in a 8×4 arrangement for illustrative purposes, while in general other sizes for the third subarray 815c are also contemplated. While FIG. 9 illustrates the third subarray 815c of receiver radiating elements 810c arranged only on the top panel 920a, some or all of the receiver radiating elements 810c may be arranged on the sides panel 920b and/or 920c.

The FMCW/pulsed radar system according to the inventive concepts disclosed herein provides a number of advantages. The majority of the radio frequency (RF) front end of the pulsed radar may be integrated in a distributed fashion across the AESA's aperture through TR module RFIC technology. The FMCW/DBF RF hardware may be integrated within the X band AESA's aperture by means of a minimal amount of additional homodyne receiver RFICs, RFIC switches and a low power FMCW transmitter, where the FMCW transmitter may be common with the pulsed one. The FMCW/pulsed radar system is highly modular and can be built from a single or multiple AESA panels, according to subarray and/or chevron configurations. Greater transmission to receiver isolation can be achieved by mounting the transmission radiation element on the top panel of a multi-panel chevron pulsed radar AESA configuration. The majority of the X band RF front end of the pulsed radar may be integrated in a distributed fashion across the AESA's aperture through TR module RFIC technology. The W band FMCW-DBF can be integrated into the X band pulsed radar AESA aperture by placing a "hole" in the AESA panel at the center, edges, or anywhere within the X band aperture's surface area. The W band FMCW/DBF RF hardware may be a separate RFIC chip set and radiation aperture. Full-duplex operation for the X Band pulsed radar and W band FMCW/DBF RF system is possible due to the wide frequency separation.

The above described inventive concepts provide for a light weight and low profile combination of FMCW/pulsed radar using a single AESA. The pulsed radar generally operates at longer radar range, and similar or higher average power. The pulsed radar provides appropriate radar techniques for applications such as meteorological, terrain mapping, sense and avoid, due regard, fire control, air traffic, synthetic aperture radar (SAR) and inverse synthetic aperture radar (ISAR).

The FMCW radar generally operates at shorter radar range, similar or lower average power and lower peak power. The FMCW radar provides appropriate radar techniques for applications such as landing zone suitability, aircraft runway incursion, wing tip anti-collision, taxiing, helicopter obstacle and wire detection, disadvantaged visual environment (DVE) landing, collision avoidance, sense and avoid, synthetic aperture radar (SAR) and inverse synthetic aperture radar (ISAR).

Both pulsed radar and FMCW radar are appropriate for state of the art terrain detection.

The embodiments of the inventive concepts disclosed herein have been described in detail with particular reference to preferred embodiments thereof, but it will be understood by those skilled in the art that variations and modifications can be effected within the spirit and scope of the inventive concepts.

What is claimed is:

1. A combined pulsed and frequency-modulated continuous wave (FMCW) active electronically scanned array (AESA) radar system, comprising:
    an AESA array of radiating elements;
    an array of transmit/receive (TR) modules, each TR module corresponding to a respective radiating element of the array of radiating elements;
    a radio frequency (RF) combiner/splitter configured to combine signals from the array of TR modules, and to split a signal to the array of TR modules;
    a transmitter configured to transmit an excitation signal to excite selected radiating elements in FMCW radar mode, or to excite all radiating elements in pulsed radar mode of the array of radiating elements via the TR modules,
    a pulsed radar receiver configured to receive radar return signals via the RF combiner/splitter from radiating elements of the array of radiating elements via the TR modules, when the transmitter is in a pulsed radar mode;
    an FMCW radar receiver configured to receive radar return signals from selected radiating elements of the array of radiating elements via the TR modules, only when the transmitter is in an FMCW radar mode,
    wherein the array comprises a first subarray of transmitter radiating elements corresponding to the transmitter in the FMCW mode, and a second subarray of receiver radiating elements corresponding to the FMCW radar receiver in the FMCW mode; and
    three panels in a chevron arrangement including a top panel and two side panels, wherein the first subarray is arranged on the top panel, and the second subarray is arranged on one of the side panels.

2. The combined pulsed and FMCW AESA radar system of claim 1, wherein the pulsed radar receiver is a super heterodyne receiver.

3. The combined pulsed and FMCW AESA radar system of claim 1, wherein the FMCW radar receiver is a homodyne receiver.

4. The combined pulsed and FMCW AESA radar system of claim 1, wherein the second subarray comprises a number of receiver radiating elements larger than a number of transmitter radiating elements of the first subarray.

5. The combined pulsed and FMCW AESA radar system of claim 4, where the first subarray is an I×J subarray, and the second subarray is an L×M subarray, wherein L is greater than I and M is greater than J.

6. The combined pulsed and FMCW AESA radar system of claim 1, wherein the T/R modules are configured to operate within a single frequency band.

7. A combined pulsed and frequency-modulated continuous wave (FMCW) active electronically scanned array (AESA) radar system, comprising:
    an AESA array of radiating elements;
    an array of transmit/receive (TR) modules, each TR module corresponding to a respective radiating element of the array of radiating elements;
    a radio frequency (RF) combiner/splitter configured to combine signals from the array of TR modules, and to split a signal to the array of TR modules;
    a transmitter configured to transmit an excitation signal to excite selected radiating elements in FMCW radar mode, or to excite all radiating elements in pulsed radar mode of the array of radiating elements via the TR modules,
    a pulsed radar receiver configured to receive radar return signals via the RF combiner/splitter from radiating elements of the array of radiating elements via the TR modules, when the transmitter is in a pulsed radar mode;
    an FMCW radar receiver configured to receive radar return signals from selected radiating elements of the array of radiating elements via the TR modules, only when the transmitter is in an FMCW radar mode,
    wherein a first set of the T/R modules are configured to operate within a first frequency band in FMCW mode, and a second set of the T/R modules are configured to operate within a second frequency band different from the first frequency band in pulsed radar mode,
    wherein the AESA array comprises a first subarray of transmitter radiating elements transmitting in the first frequency band corresponding to the FMCW mode, a second subarray of transmitter/receiver radiating elements transmitting and receiving in the second frequency band corresponding to the pulsed mode, and a third subarray of receiver radiating elements receiving in the first frequency band corresponding to the FMCW mode; and
    three panels in a chevron arrangement including a top panel and two side panels, wherein the first subarray is arranged on the top panel, and the second subarray is arranged on one or more of the side panels.

8. The combined pulsed and FMCW AESA radar system of claim 7, wherein the first frequency band has a frequency range between about 30 and 300 GHz, and the second frequency band has a frequency range between about 3 and 30 GHz.

* * * * *